United States Patent [19]
Maier

[11] Patent Number: 5,912,829
[45] Date of Patent: *Jun. 15, 1999

[54] UNIVERSAL NARROW BAND SIGNAL CONDITIONER

[75] Inventor: Lawrence Carl Maier, New Haven, Vt.

[73] Assignee: Simmonds Precision Products, Inc., Richfield, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/823,501

[22] Filed: Mar. 25, 1997

Related U.S. Application Data

[60] Provisional application No. 60/014,259, Mar. 28, 1996.
[51] Int. Cl.$^6$ ..................................................... G06F 17/14
[52] U.S. Cl. ......................................... 364/726.02; 702/77
[58] Field of Search ........................ 364/726.02, 726.03, 364/726.04, 726.05, 724.09; 702/77

[56] References Cited

U.S. PATENT DOCUMENTS 3,754,128  8/1973  Corinthios ........................... 364/726.01
5,353,344  10/1994  Knitsch .............................. 364/724.09

FOREIGN PATENT DOCUMENTS 0173243  3/1986  European Pat. Off. .
60-117976  6/1985  Japan .

OTHER PUBLICATIONS

"Fast Algorithms for the Discrete W Transform and for the Discrete Fourier Transform"; Zhongde Wang; IEEE Transactions on Acoustics, Speech and Signal Process, Aug. 1984, vol. ASSP–32; No. 4, pp. 803–816.
"An Efficient FFT Algorithm Based on the Discrete Sine Transform"; Gupta et al.; IEEE Transactions on Signal Processing, vol. 39; No. 2, Feb. 1, 1991, pp. 486–490.
"A New Computation Procedure for the Discrete Fourier Transform" by J. S. Mason; Electronic Circuits and Systems, Jan. 1978, vol. 2., No. 1; pp. 16–20.
"A Two–Channel Digital Instrument for Real Time Analysis" by Carlo Offelli; IEEE Instrumentation and Measurement Technology Conference; Apr. 1988; p. 399.

Primary Examiner—David H. Malzahn
Attorney, Agent, or Firm—William E. Zitelli; Mark D. Saralino

[57] ABSTRACT

A system for processing a signal made up of at least one spectral component. The system includes a sampling circuit for periodically sampling the signal to obtain a sequence of discrete data samples representing the signal; and a computational circuit for computing a fast Fourier transform (FFT) of the sequence of discrete data samples to an extent which the FFT is computed using substantially exclusively non-complex arithmetic operations, and for using a resultant portion of the FFT to obtain a phase and amplitude of the at least one spectral component making up the signal.

13 Claims, 7 Drawing Sheets

UNIVERSAL NARROW BAND SIGNAL CONDITIONER

This application claims the benefit of U.S. Provisional application Ser. No. 60/014,259, filed Mar. 28, 1996.

TECHNICAL FIELD

The present invention relates generally to a signal processing system. More specifically, the invention relates to a signal processing system such as a signal conditioner which utilizes the attributes of fast Fourier transform calculations without requiring substantial complex arithmetic.

BACKGROUND OF THE INVENTION

The fast Fourier transform (FFT) is a known method of converting a signal into its spectral components for analysis and manipulation. The FFT has utility in a vast variety of applications including signal processing, image enhancement, etc. Unfortunately, the conventional approach to FFTs requires a very large number of complex multiplications and complex additions. These FFT calculations generally require at least a microprocessor with a dedicated math coprocessor to allow execution of the FFT within a period of time suitable for use in real time applications.

In many applications, there is neither the component space, time nor budget allowance available to provide the necessary processing power to compute the FFTs. For example, a conventional FFT performed on a 2048 point input requires on the order of 11,264 complex multiplies and twice that number of complex adds. As is known, complex arithmetic operations require substantially more processing steps as compared to real arithmetic operations. Such demands in processing make real time computations difficult in the absence of high speed, high cost processors and coprocessors. Thus, it has been impractical in the past to utilize FFTs in those applications having space, time or cost constraints.

FFTs are particularly useful in the processing or conditioning of an output signal of a sensor or other type of detection device. For example, different types of sensors (e.g., resistive, capacitive, inductive) are used for sensing parameters such as quantity, pressure, temperature, position, etc. By taking the FFT of the output signal, it is possible to condition the signal in order to obtain information such as phase and amplitude. Unfortunately, it has not always been practical to provide such sensors with the necessary computational hardware. As an example, many aircraft have different sensors which require real time processing. Such sensors frequently require a high speed microprocessor with a dedicated math coprocessor in order to condition the signal using FFTs. This results in increased size and expense making such sensors less attractive in an aircraft environment. In view of the aforementioned shortcomings associated with the conventional use of FFTs, there is a strong need in the art for a signal processing system which utilizes FFTs in such a way that does not require substantial processing power even for real time applications. More specifically, there is a strong need in the art for a system which processes a signal by calculating its FFT without relying upon complex arithmetic operations. Even more specifically, there is a strong need for such a system in a signal conditioner which is capable of processing a signal in real time using simple arithmetic operations.

SUMMARY OF THE INVENTION

The present invention provides a system for processing a signal by calculating its FFT without necessarily requiring complex arithmetic operations. As a result, the FFT can be calculated easily in real time. A simple, low-cost microprocessor is suitable for carrying out the calculations. There is no need for expensive high-speed processors. In a particular embodiment, the present invention has utility in connection with conditioning a sensor output signal. The invention exhibits a very narrow bandpass response useful for filtering out interference outside the excitation frequency of the sensor.

According to one aspect of the invention, an apparatus is provided for processing a signal made up of at least one spectral component. The apparatus includes a sampling circuit for periodically sampling the signal to obtain a sequence of discrete data samples representing the signal; and a computational circuit for computing a fast Fourier transform (FFT) of the sequence of discrete data samples to an extent which the FFT is computed using substantially exclusively non-complex arithmetic operations, and for using a resultant portion of the FFT to obtain a phase and amplitude of the at least one spectral component making up the signal.

In accordance with another aspect of the invention, a narrow band signal conditioner is provided for processing an output signal from a device, the output signal being made up of at least one spectral component. The signal conditioner includes a sampling circuit for periodically sampling the output signal to obtain a sequence of discrete data samples representing the output signal; and a computational circuit for computing a fast Fourier transform (FFT) of the sequence of discrete data samples to an extent which the FFT is computed using substantially exclusively non-complex arithmetic operations, and for using a resultant portion of the FFT to obtain a phase and amplitude of the at least one spectral component making up the output signal.

According to still another aspect of the invention, a method for processing a signal made up of at least one spectral component is provided. The method includes the steps of periodically sampling the signal to obtain a sequence of discrete data samples representing the signal; and computing a portion of a fast Fourier transform (FFT) of the sequence of discrete data samples to an extent which the FFT is computed using substantially exclusively non-complex arithmetic operations, and for using a resultant portion of the FFT to obtain a phase and amplitude of the at least one spectral component making up the signal.

According to another aspect of the invention, an apparatus for processing a signal having a predetermined frequency is provided. The apparatus includes a sampling circuit for sampling the signal to obtain a sequence of discrete data samples representing the signal; and a computational circuit for computing a portion of a fast Fourier transform (FFT) of the sequence of discrete data samples to obtain a value of a spectral line component of the FFT corresponding to the predetermined frequency, to the exclusion of computing values of spectral line components of the FFT corresponding to at least one other frequency.

In accordance with yet another aspect, a method of processing a signal is provided including establishing a frequency of the signal; and obtaining a fast Fourier transform (FFT) of the signal by selecting a sampling frequency and total number of samples of the signal such that a spectral line component of the resulting FFT will correspond to the frequency of the signal, obtaining the samples, and computing the FFT of the signal by calculating a value of the spectral line component corresponding to the frequency of the signal while substantially omitting arithmetic operations associated with obtaining values of other spectral line components of the FFT.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

The present invention will now be described with reference to the drawings, wherein like reference numerals are used to refer to like elements throughout.

Figure 1:
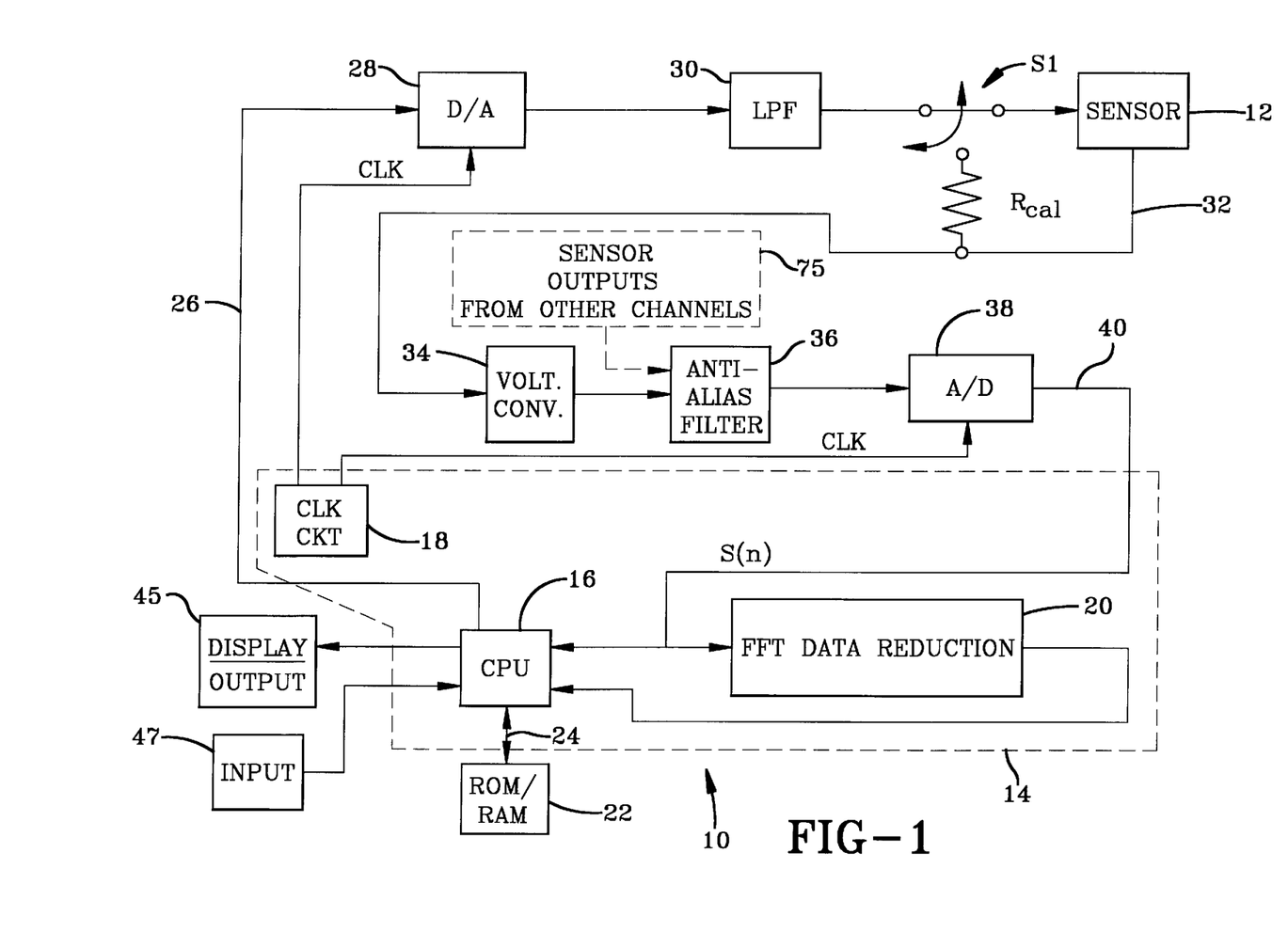
FIG. 1 is a block diagram of a signal conditioner for processing the output of a sensor in accordance with the present invention.

Referring initially to FIG. 1, a signal processing circuit 10 is provided for conditioning an output signal of a sensor 12 in accordance with the exemplary embodiment of the present invention. The sensor 12 can be any of a variety of different types of conventional sensors. For example, the sensor 12 may be a capacitive sensor used to measure fuel height or quantity in an aircraft. Alternatively, the sensor 12 may be a resistive type which senses resistance in relation to pressure, temperature, etc., or an inductive type which senses inductance in relation to position, etc. As will be appreciated, the sensor 12 as described herein is not necessarily limited to a particular type sensor or application. It is only for sake of illustrating the advantages of the invention that the sensor 12 will be discussed primarily in the context of a capacitive sensor for measuring fuel height or quantity.

The signal processing circuit 10 includes a microprocessor 14 for carrying out the various control and computational operations described herein. As is described in more detail below, the microprocessor 14 in accordance with the invention computes at least a portion of the FFT of the sensor output signal using only real addition and multiplication operations. This enables the FFT to be computed quickly and in real time. The microprocessor 14 preferably is selected from any of a variety of low-cost microprocessors operating at relatively low clock speeds. As will be appreciated, a high-speed microprocessor is unnecessary as the FFT for the signal of interest can be calculated without requiring complex arithmetic operations. In the exemplary embodiment, the microprocessor 14 is general purpose microprocessor such as an Intel 80186 running at 40 MHz which is available from Intel Corporation. The manner in which the microprocessor 14 may be programmed to carry out the various operations described herein will be readily apparent to those having ordinary skill in the art of programming based on the disclosure provided herein. As a result, additional detail has been omitted for sake of brevity.

The microprocessor 14 is nominally divided in FIG. 1 so as to include a central processing unit 16, a clock circuit 18, and an FFT data reduction section 20. In actuality, each of these components are included primarily within the central processing unit 16 itself but are illustrated separately for ease of understanding. The CPU 16 is responsible for carrying out the various control and arithmetic operations within the signal processing circuit 10. The CPU 16 is connected to a memory 22 which preferably includes random access memory (RAM) and read only memory (ROM). The memory 22 stores the operating code for the signal processing circuit 10 for carrying out the operations described herein. In addition, the memory 22 is used for storing data, etc. which is accessed by the CPU 16 via bus 24.

The sensor 12 in the exemplary embodiment is excited by a sinewave or other arbitrary waveform. More particularly, the CPU 16 provides excitation waveform data on bus 26 to the input of a digital-to-analog converter (D/A) 28. The D/A 28 converts the digital waveform data into analog data which is provided to a low pass filter (LPF) 30. The LPF 30 filters the data to remove harmonics and clock frequencies and to convert the data into a continuous analog waveform. The output of the LPF 30 serves as the excitation waveform which is input to the sensor 12. According to the particular embodiment described herein, the excitation waveform is a sinusoid having a frequency of 18.24818 kilohertz (kHz), or a period of 54.8 microseconds. The D/A 28 is 16 bits wide and is updated every 3.425 microseconds during waveform generation. The LPF 30 has a 5-pole Butterworth response with a −3 db frequency of 31.0946 kHz. The output of the LPF 30 is connected to the sensor driver or excitation circuitry (not shown) conventionally found within the sensor 12.

The sensor 12 produces an analog output signal on line 32 which has the same frequency as the excitation waveform but which varies in amplitude and/or phase depending on the parameter being sensed. For example, the phase and/or amplitude of the sensor output changes in accordance with the amount/height of fuel within a fuel tank in which the sensor 12 is located. In such an example, the output signal of the sensor 12 represents the signal of interest. Signals at any other frequencies are attributable to noise or interference typically. By determining the FFT of the output signal, the signal processing circuit 10 is able to associate the phase and/or amplitude of the sensor output signal with the amount/height of fuel.

More specifically, the output of the sensor 12 on line 32 is provided to a voltage converter circuit 34 which converts the sensor output signal to a proportional voltage as is conventional. The proportional voltage from the voltage converter circuit 34 is then provided to an anti-alias filter 36 and then to an analog-to-digital converter (A/D) 38. The A/D 38 samples the output signal from the sensor 12 periodically, and the digitized signal is provided to the microprocessor 14 via bus 40. The digitized data is input to the FFT data reduction section 20 as part of the CPU 16 which, as is described in more detail below, calculates at least a portion of the FFT of the digitized sensor output signal using only real additions and real multiplications. As will be appreciated based on the discussion provided below in connection with FIGS. 3A and 3B, such calculation of the FFT produces results identical to a normal FFT calculation involving numerous complex arithmetic operations at least with respect to the signal of interest, e.g., the sensor output signal. The FFT from the FFT data reduction section 20 is then further processed by the CPU 16 in order to determine the desired parameter such as fuel height or quantity. As mentioned above, however, the actual processing performed by the FFT data reduction section 20 is carried out by the CPU 16 itself and the discrete elements are shown in FIG. 1 only for ease of understanding.

In the exemplary embodiment, the anti-alias filter 36 has a 9-pole Butterworth response with a −3 db frequency of 26.6525 kHz. The A/D 38 is 16 bits wide and samples the filter output every 6.85 microseconds during measurement of the output signal of the sensor 12. Thus, it is noted that the frequency at which the sensor output signal is sampled is exactly eight times the frequency of the sensor output signal. Such aspect is significant for reasons which are explained more fully below. The clock circuit 18 included in the microprocessor 14 is controlled by the CPU 16 and provides the respective clock signals to the D/A 28 and the A/D 38 to update the excitation waveform data and sample the sensor output signal. The signal processing circuit 10 further includes a display 45 or other type of output coupled to the CPU 16 for displaying or otherwise outputting the information obtained by processing the sensor output signal. In addition, the signal processing circuit 10 may include an input section 47 such as a keypad for allowing an operator to input information according to a particular application.

Figure 2:
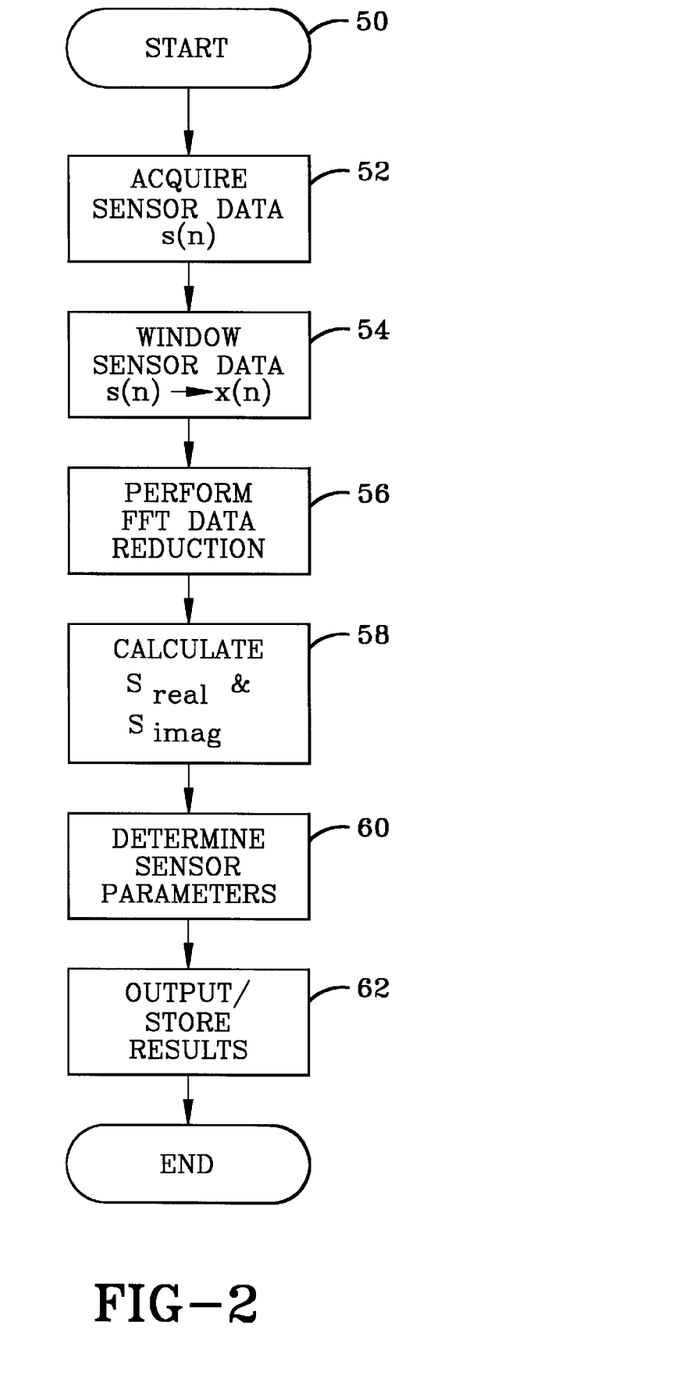
FIG. 2 is a flowchart suitable for programming the microprocessor in FIG. 1 to process the output of the sensor by calculating the FFT in accordance with the present invention.

Referring now to FIG. 2, a flowchart representing the operation of the signal processing circuit 10 is shown. Operation begins at step 50 when the circuit 10 initializes itself upon being powered up, for example. Next, in step 52 the circuit 10 acquires a set of sensor data, i.e., the digitized sensor output signal data s(n) from the A/D 38. The acquisition of such data is described in more detail below in connection with FIGS. 4 and 5. In the exemplary embodiment, a sequence of 2048 data samples (n=2048) of the sensor output signal s(n) is obtained at the aforementioned sampling rate of 6.85 microseconds. The 2048 data samples represent 256 complete and consecutive cycles at a rate of eight data samples per cycle. The sampled data s(n) are stored sequentially in memory (not shown) within the FFT data reduction section 20 or in the memory 22, and are designated sequentially in an array with the first sample as n=0 and the last sample as n=2047.

Following step 52, the sensor data s(n) is windowed in step 54 using conventional techniques to eliminate Gibb's oscillations resulting from the finite sample time. As an example, a Blackman window function is used, although any standard window function may be selected as will be appreciated. Such window function is shown below whereby x(n) represents the windowed value, and s(n) represents the sampled value from the A/D 38:

Blackman Windowing in Step 54

For n=0 to 2047:

$x(n) = s(n) * [0.42 - 0.5 * \cos(2\pi n/2047) + 0.08 * \cos(4\pi n/2047)] * K$ where K is a scaling constant to set the optimum word size of the result; for example, K=65536 would scale the result to a sixteen bit machine using 32-bit arithmetic.

The windowed value x(n) for each data point is calculated within the FFT data reduction section 20 (e.g., by the CPU 16) in accordance with the above equations, and the result is stored in the original data location in memory, thus preserving the data sample order. The array of windowed values is denoted by $x(n)_{2048}$.

Figure 3A:
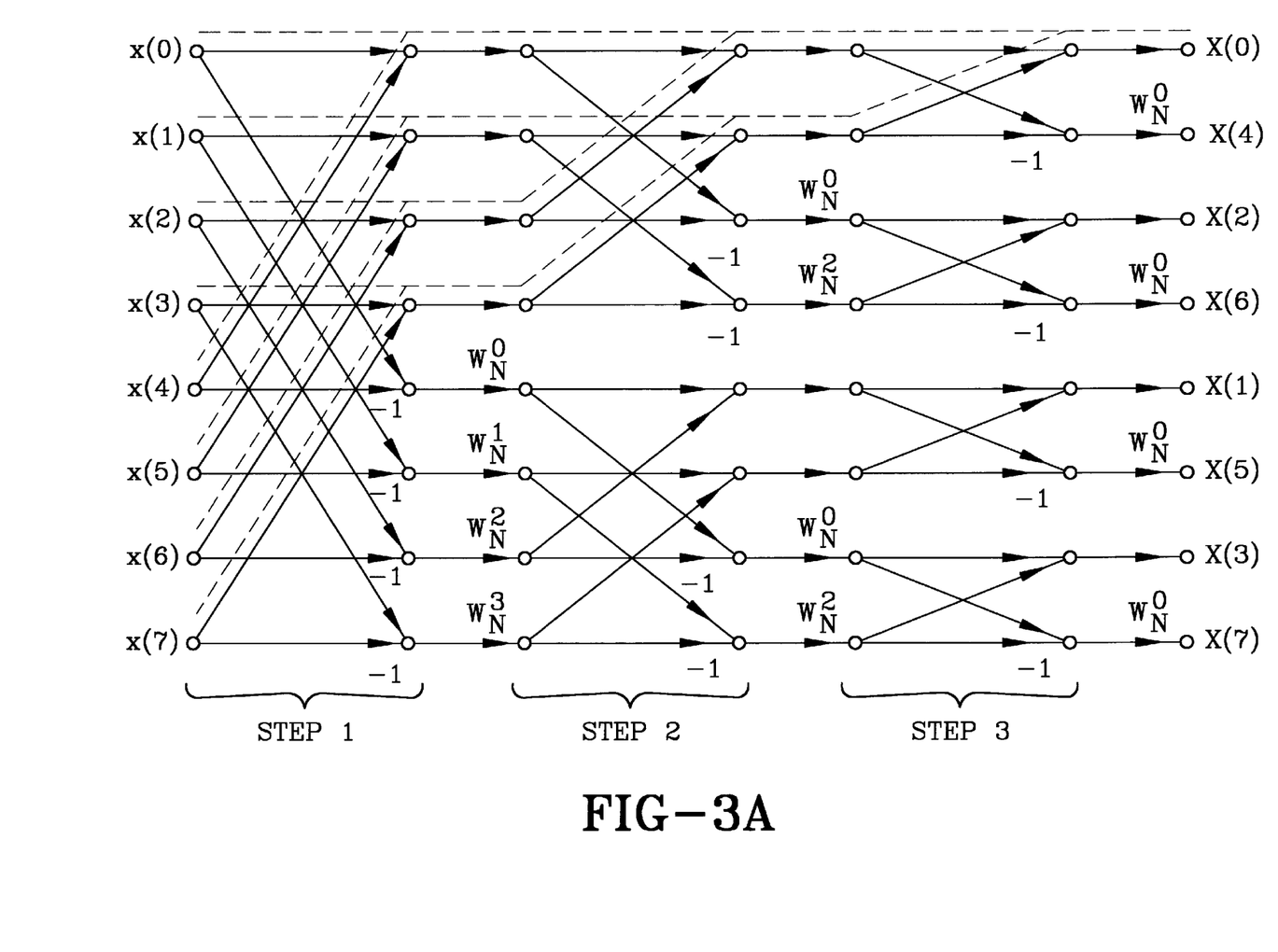
FIG. 3A is a flow graph of a complete decimation-in-frequency decomposition of an eight-point FFT computation, the flow graph being modified to illustrate the characteristics of the present invention.

Continuing to refer to FIG. 2, FFT data reduction in accordance with the invention is performed in step 56 in order to calculate at least a portion the FFT of the sampled data. In order to facilitate understanding as to how the FFT of the windowed sensor output signal is computed in step 56, reference is made to FIGS. 3A and 3B, and initially to FIG. 3A. In FIG. 3A there is shown a flow graph of a complete decimation-in-frequency decomposition of an eight-sample FFT computation. Such flow graph is described in detail, for example, in the book entitled "Digital Signal Processing" by Oppenheim, A. V. and Schaffer, R. W. (Prentice-Hall 1975). The points x(0) thru x(7) on the left hand side of the flow graph represent the data samples for which the FFT is to be computed. The points X(0) thru X(7) on the right hand side of the flow graph represent the corresponding spectral line components of the resultant FFT.

The flow graph in FIG. 3A takes advantage of the inherent symmetry in FFT computations. Points x(0) thru x(7) are interconnected via a collection of FFT "butterflies". Each butterfly represents in the general case a set of complex arithmetic operations carried out on a pair of data points. However, in the specific case a complex arithmetic operation is encountered during the calculation of the FFT only in those instances where a complex weighting factor $W_N$ is encountered along the flow path. Thus, those paths along the flow graph which do not include a complex weighting factor $W_N$, i.e., those paths highlighted by dashed lines, involve only real addition operations. These operations can be summarized as follows:

In each step from left to right along the flow graph, the data points can be divided into two groups. Therefore, in step 1 the spectral line components corresponding to data points x(0) thru x(7) are divided into two groups x(0) thru x(3) and x(4) thru x(7). The first data point x(4) in the second group is then added to the first data point x(0) in the first group. Similarly, the second data point x(5) in the second group is added to the second data point x(1) in the first group, and so on. In step 2, the spectral line components corresponding to data points x(0) thru x(3) can again be divided into two groups x(0) thru x(1) and x(2) thru x(3). Corresponding values from each group are again added using only the paths based on real addition operations.

Hence, it will be appreciated that at least a portion of an FFT for a set of data points can be calculated using exclusively real arithmetic operations. Each step along the flow graph results in a one-half reduction in the number of spectral line components represented only by real arithmetic operations. As a result, if the operation is carried out completely from left to right in the flow graph, only the DC spectral line component X(0) is obtained. Prior to the last step, however, intermediate values for a portion of the spectral line components are available. The number of spectral line components for which values are available will depend on the initial number of data points and the number of times the real addition operations are carried out in order to reduce the number by half.

Figure 3B:
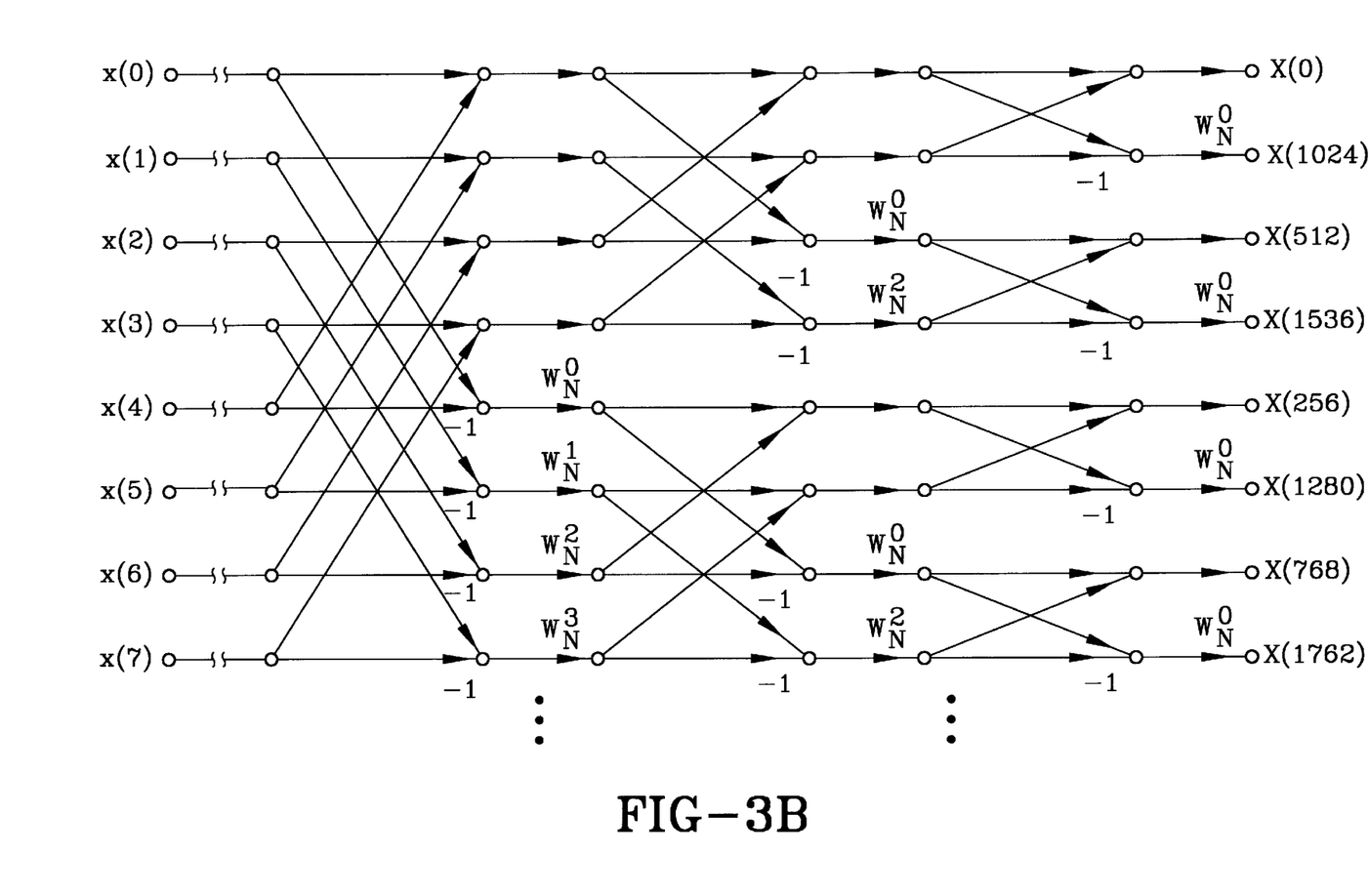
FIG. 3B is a flow graph representing a portion of a complete decimation-in-frequency decomposition of a 2048 point FFT computation to illustrate the characteristics of the present invention.

Referring now to FIG. 3B, a flow graph similar to that shown in FIG. 3A is illustrated. The flow graph however represents only a portion of a decimation-in-frequency decomposition of a 2048-sample FFT compution. Shown are only the spectral line components corresponding to data points x(0) thru x(7) out of data points x(0) thru x(2047). Assuming, for example, that the FFT for 2048 data points is calculated according to the flow graph only along those paths which involve real addition operations in the manner discussed above with respect to FIG. 3A, eventually the flow graph for the 2048 data points would be reduced to that portion shown in FIG. 3B. Applying the same reduction exemplified in FIG. 3A, the original 2048 spectral line components corresponding to data points x(0) thru x(2048) are reduced in number by a factor of 2 in each step. Hence, after eight steps of reduction, there are eight spectral line components ($2048/2^8$) remaining which are arrived at based only on real additions. Such spectral line components correspond to data points x(0) thru x(7) as shown in FIG. 3B.

Those familiar in the art of FFTs and butterfly operations will appreciate that the specific spectral line components corresponding to the data points x(0) thru x(7) are known based on bit-reversed binary order. For example, in a 2048-point FFT the spectral line component corresponding to data point x(1) (i.e., x{00000000001}) is X(1024) (i.e., X{10000000000}). Hence, for the data points x(0)–x(7), the respective corresponding spectral line components are X(0), X(1024); X(512), X(1536), X(256), X(1280), X(768) and X(1792) as shown in FIG. 3B.

Moreover, it will be appreciated that the particular frequencies represented by the spectral line components are determined as follows:

$$\text{line component frequency} = \frac{\text{line component number}}{N} * fs$$

where N is the total number of samples, and fs is the sampling frequency.

Consequently, the spectral line components shown in FIG. 3B are related to the sampling frequency as follows, where N=2048:

| Spectral Line Component | Frequency |
| --- | --- |
| X(0) | 0*fs (DC) |
| X(1024) | (½)*fs |
| X(512) | (¼)*fs |
| X(1536) | (¾)*fs |
| X(256) | (⅛)*fs |
| X(1280) | (⅝)*fs |
| X(768) | (⅜)*fs |
| X(1792) | (⅞)*fs |

The spectral line components X(1024), X(512) and X(256) are noteworthy as these lines represent frequencies which are an integral fraction of the sampling frequency. For example, the sampling frequency fs is exactly eight times the frequency represented by spectral line component X(256). Stated another way, spectral line component X(256) represents a frequency which is exactly one-eighth the sampling frequency.

Referring again to FIG. 3B, once the flow graph is reduced to the number of lines shown, the values of the spectral line components X(0), X(1024) . . . , X(1792) can be calculated with only a small number of complex arithmetic operations compared to the number of complex operations which would ordinarily be performed had the FFT for all 2048 points been calculated. Hence, should the particular frequency(s) of the signal of interest be limited to those spectral line components remaining after the above mentioned reduction, the FFT of the signal of interest can be determined substantially without any complex arithmetic operations.

In fact, in the case where the number of spectral line components is reduced down to eight as shown in FIG. 3B, it is noted that in all cases the weighting factor $W^k_N$ in the remaining portion of the flow graph can be represented by a real number equal to either 1, 0, √1, √2 or √2. Thus, the values of the spectral line components X(0, X(1024), . . . , X(1792) can be calculated without any complex arithmetic operations based on this predetermined relationship.

Such properties of the FFT calculation have been identified by the inventor herein, and are used to simplify greatly the FFT computation. As discussed above in connection with FIG. 1, 2048 samples are obtained from the sensor output signal in the exemplary embodiment. In addition, the sensor output signal is sampled at a rate which is eight times the frequency of the sensor output signal. Thus, the signal of interest (i.e., the sensor output signal) is directly represented by the spectral line component X(256) which, as noted above, relates to the frequency component which is one-eighth the sampling frequency. By calculating the value of the spectral line component X(256) based on the lines remaining in FIG. 3B, the FFT of the sensor output signal can be calculated entirely with very few, or even zero, complex arithmetic operations. The present invention makes this possible by ensuring that the signal of interest corresponds to the frequency of one or more of the spectral line components remaining after the above-described reduction. Such aspect is described in more detail below in relation to FIGS. 4 and 5.

Returning now to FIG. 2, the 2048 samples representing the sensor output signal are windowed in step 52 as mentioned above. Next, in step 56 the relevant portion of the FFT of the windowed data is calculated in the FFT data reduction section 20 by the CPU 16 (FIG. 1). Such calculation is performed using the properties discussed above in relation to FIGS. 3A and 3B. Specifically, the spectral line components corresponding to the data points are reduced by performing eight steps of reduction based on real addition operations as follows:

(1) Reduction of Array Size from 2048 to 1024 Values

Using simple unsigned addition as represented below, the CPU 16 divides the array $x(n)_{2048}$ of 2048 data samples into two groups of 1024 samples each. The CPU 16 then adds the corresponding values from each group such that:

For n=0 to 1023

$x(n)_{1024} = x(n)_{2048} + x(n+1024)_{2048}$

As a result, the array position of $x(0)_{1024}$ is the same as $x(0)_{2048}$. The array position of $x(1)_{1024}$ is the same as $x(1)_{2048}$, etc., up to the position of $x(1023)_{1024}$. Array positions $x(1024)_{2048}$ thru $x(2047)_{2048}$ will now be empty (or at least ignored). It will be appreciated that these array positions represent spectral line components that are no longer of interest. This process is then repeated as follows until the resulting array size is 8:

(2) Reduction of Array Size from 1024 to 512 Values

For n=0 to 511

$x(n)_{512} = x(n)_{1024} + x(n+512)_{1024}$ (3) Reduction of Array Size from 512 to 256 Values For n=0 to 255

$x(n)_{256} = x(n)_{512} + x(n+256)_{512}$ (4) Reduction of Array Size from 256 to 128 Values For n=0 to 127

$x(n)_{128} = x(n)_{256} + x(n+128)_{256}$ (5) Reduction of Array Size from 128 to 64 Values
For n=0 to 63

$x(n)_{64} = x(n)_{128} + x(n+64)_{128}$ (6) Reduction of Array Size from 64 to 32 Values
For n=0 to 31

$x(n)_{32} = x(n)_{64} + x(n+32)_{64}$ (7) Reduction of Array Size from 32 to 16 Values
For n=0 to 15

$x(n)_{16} = x(n)_{32} + x(n+16)_{32}$ (8) Reduction of Array Size from 16 to 8 Values
For n=0 to 7

$x(n)_{8} = x(n)_{16} + x(n+8)_{16}$

The array elements $x(n)_8$ for n=0 to 7 correspond to the spectral line components X(0), X(1024), . . . , X(1792), respectively, following the reduction of the FFT data as determined using only real additions to the point shown in the flow graph of FIG. 3B. By reducing the array elements to eight spectral line components as shown in FIG. 3B, one of the line components is the X(256) spectral line component. As previously mentioned, in this embodiment the spectral line component X(256) represents exactly the frequency of the sensor output signal. Thus, by completing the calculation of the spectral line component X(256) according to the flow graph in FIG. 3B, the complete FFT of the signal of interest is obtained. Thus, substantially fewer complex arithmetic operations are required as compared to the case where the entire FFT of the 2048 samples was performed. Since the signal of interest is confined to one particular frequency, numerous unnecessary complex calculations are avoided.

In order to complete the calculation of the spectral line component X(256), it is recognized that the remaining eight spectral line components will be related by a weighting factor of either 1, 0, −1, √2 or √2. Thus, it is then possible to complete the calculation of the spectral line component X(256) to obtain the real and imaginary components of the sampled signal without necessarily performing any complex arithmetic operations. More specifically, the real and imaginary components (representing the phase and amplitude) of the sampled sensor output signal s(n), i.e., $S_{real}$ and $S_{imag}$, respectively, can then be calculated based on the reduced values of $x(n)_8$ as follows by the CPU 16 in step 58 of FIG. 2. The calculation is accomplished as set forth below, using signed arithmetic since the answer may be positive or negative.

$S_{real} = x(0)_8 - x(4)_8 + [(x(1)_8 - x(3)_8 - x(5)_8 + x(7)_8)/\sqrt{2}]$.

$S_{imag} = x(6)_8 - x(2)_8 - [(x(1)_8 + x(3)_8 - x(5)_8 - x(7)_8)/\sqrt{2}]$.

It is noted that the determination of the real and imaginary components of the sensor output signal as determined in steps 56 and 58 requires only 2032 unsigned real additions, 10 signed additions, and two real multiplies. Similar savings result if calculating one or more of the other remaining spectral line components. This is in stark contrast to the conventional FFT where a typical similar computation would require 11,264 complex multiplies and twice that number of complex adds as mentioned above. Hence, the present invention provides a vast improvement with respect to reducing the computing power necessary for processing the sensor output signal in real time.

Referring briefly back to FIG. 1, during an initialization routine when the signal processing circuit 10 calibrates itself, a switch S1 is utilized to selectively switch a calibration resistor $R_{cal}$ in place of the sensor 12. Such resistor is used to provide a phase and amplitude reference. The phase of the data provided by the CPU 16 on bus 26 to generate the excitation waveform is adjusted such that the value of $S_{real}$ will be ≅0. Thus, the resistive and capacitive portions of the sensor output signal are easily measured simply by using the real (capacitance) or imaginary (resistance) part of the resultant $S_{imag}$ and $S_{real}$ components of the sensor output signal as determined by the FFT determined in step 56 (FIG. 2). The calibration resistor $R_{cal}$ having a known value can be periodically switched in place of the sensor 12 via the switch S1 to calibrate circuit operation. However, it will be appreciated that various other techniques for providing phase and amplitude calibration could also be used. For example, the calibration resistor $R_{cal}$ could be replaced by a known capacitor or inductor.

Referring again to FIG. 2, assuming the circuit 10 has been calibrated and $S_{imag}$ and $S_{real}$ have been calculated as noted above in step 58, the circuit 10 proceeds to step 60. In step 60, the CPU 16 determines the desired parameters based on the sensor output signal. In the exemplary embodiment, the capacitance of the sensor 12 is indicative of fuel height within a tank in the aircraft, i.e., the fuel quantity. In order to determine the capacitance of the sensor 12 based on $S_{imag}$ and $S_{real}$, the following relationships are noted:

If the value of the calibration resistor in kilohms is $R_{cal}$, the measured value of the calibration resistor is $S(R_{cal})_{imag}$, and the measured value of the unknown capacitance of the sensor 12 is $S(sensor)_{real}$, then the value of the sensor capacitance in picofarads can be calculated as follows:

Sensor Capacitance=$(10^9 * |S(sensor)_{real}|)/2*\pi* R_{cal}*18,248.18*|S(R_{cal})_{imag}|)$ The value of the resistance of the sensor in kilohms, if any, is calculated as follows:

Sensor Resistance=$R_{cal}*|S(R_{cal})_{imag}|/|S(sensor)_{imag}|$, where $S(sensor)_{imag}$ is the measured value of the sensor resistance as calculated in step 58.

It is noted that care must be taken in step 60 with the sensor resistance calculation, since the value of $S(sensor)_{imag}$ is normally very close to 0. The result is that the calculation may produce a divide by zero or a register overflow. In either case, the value of resistance should be set to the maximum value for the selected word length. The resistance of other parameters, such as an RTD or other resistive sensor may be calculated using the same equation as for the capacitive resistance except substituting the associated calibration resistor and measured resistive sensor values. Following step 60, the microprocessor 14 outputs and/or stores the calculated sensor parameters in step 62. For example, the microprocessor 14 may calculate the fuel height based on the measured capacitance of the sensor 12 and display the results on the display output 45. The process described in FIG. 2 can then be repeated so as to update continuously the sensor reading as will be appreciated.

Figure 4:
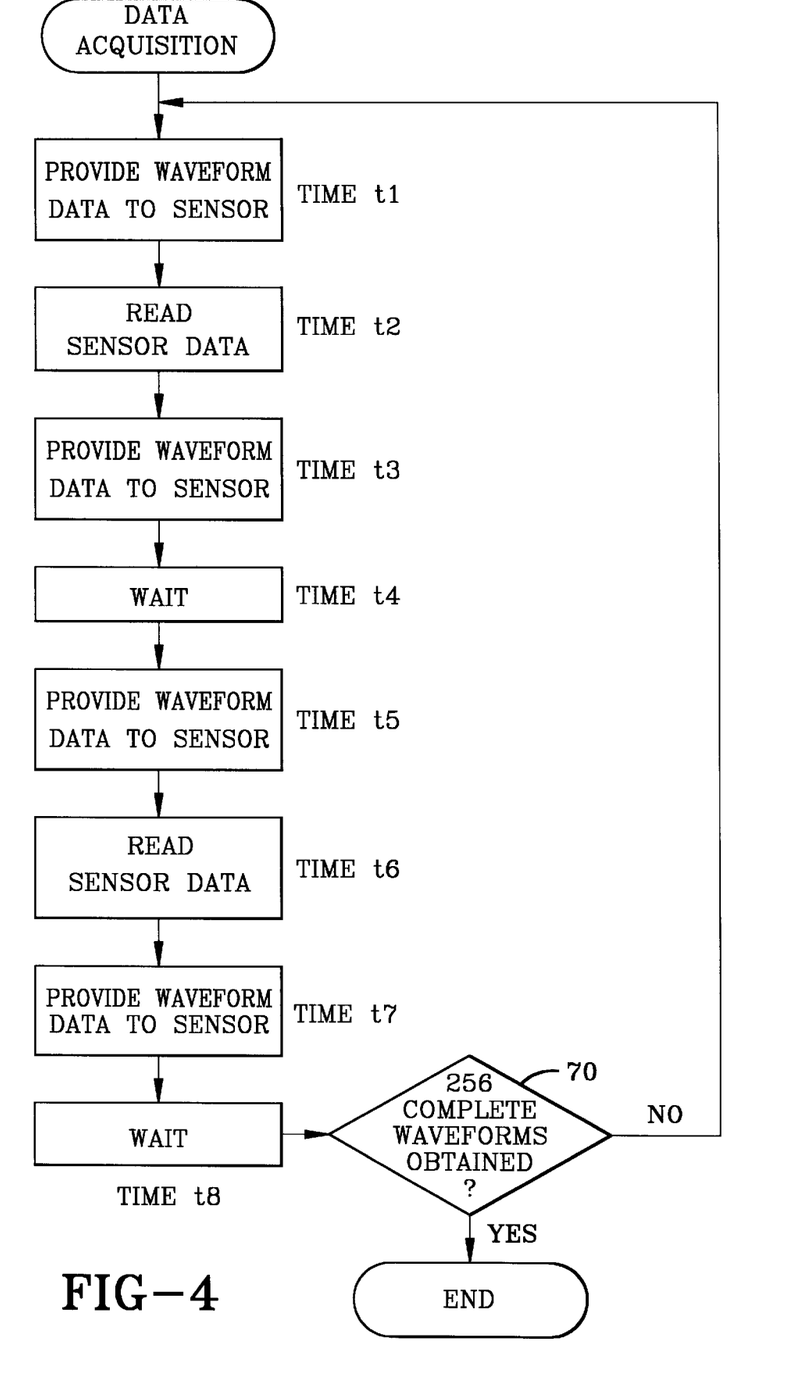
FIG. 4 is a flowchart suitable for programming the microprocessor in FIG. 1 to acquire data from the sensor in accordance with the present invention.
Figure 5:
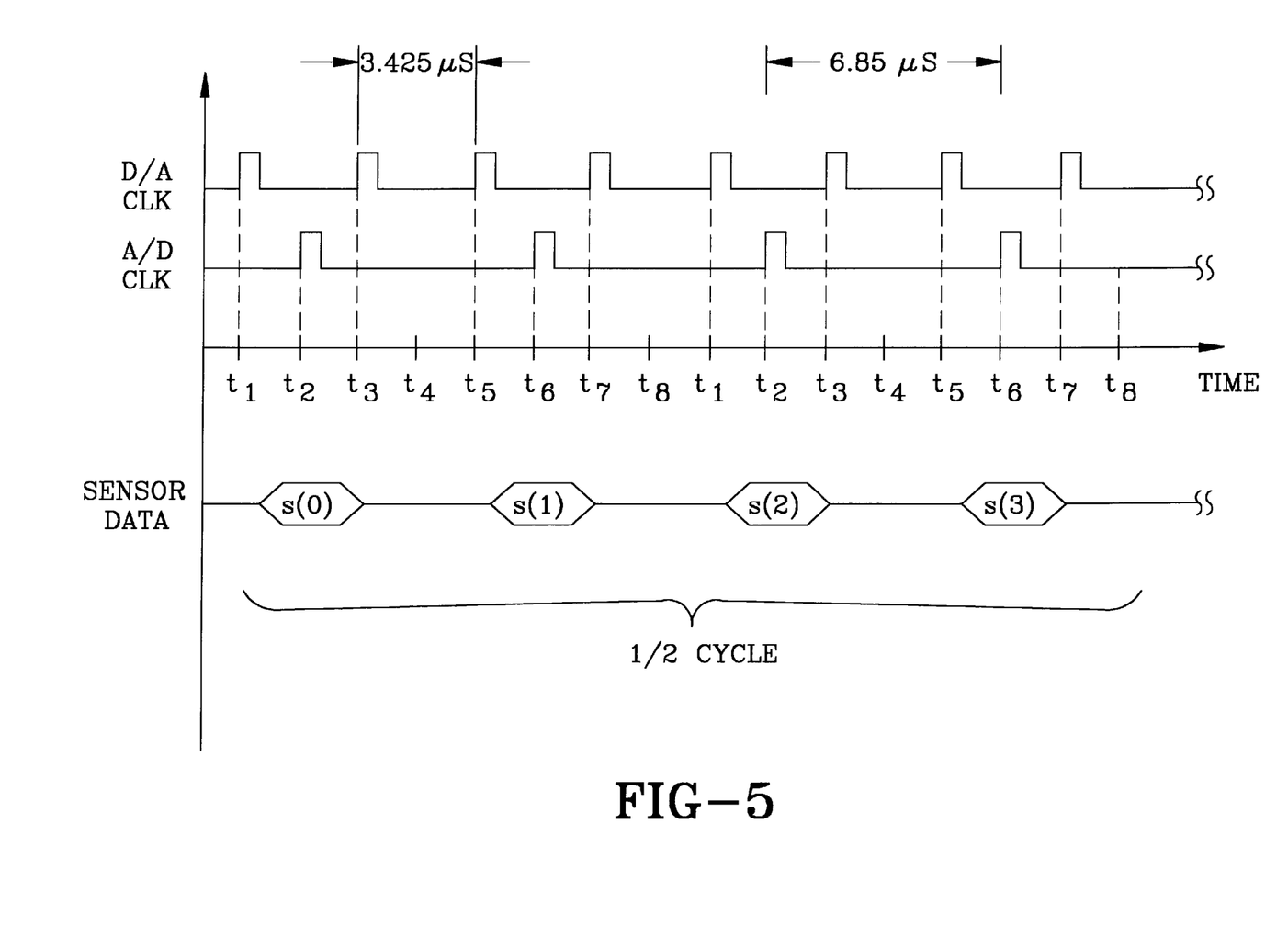
FIG. 5 is a timing diagram illustrating the data acquisition routine represented in FIG. 4 in accordance with the present invention.

FIGS. 4 and 5 illustrate the excitation waveform generation and data acquisition process of the present invention as referred to in step 52 of FIG. 2. As mentioned above, it is desirable that the signal of interest coincide with one of the remaining spectral line components following the FFT data reduction. One means for doing this is to phase lock the signal of interest with the sampling of the signal to achieve the corresponding proportional relationship. Generally speaking, the exemplary embodiment of the present invention utilizes an algorithm which interlaces the provision of the sensor excitation waveform data with the sampling of the sensor output signal to ensure a fixed phase and frequency relationship between the excitation waveform frequency and the sampling rate. For example, referring to FIG. 4 the CPU 16 at time t1 provides waveform data to the D/A 28. At time t2, the CPU 16 reads and stores the data from the A/D 38.

At time t3, the CPU 16 provides the next waveform data to the D/A 28. Next, at time t4 the CPU 16 waits a predetermined time and then at time t5 the CPU 16 provides another waveform data to the D/A 28. At time t6, the CPU 16 reads and stores the next sensor output data via the A/D 38. Thereafter, the CPU 16 at time t7 provides another waveform data to the D/A 28, and at time t8 the CPU 16 again waits a predetermined time.

In the exemplary embodiment, times t1—t8 are as follows (in microseconds):

t1=0.00
t2=1.712
t3=3.425
t4=5.137 (wait for 1.712 $\mu$s)
t5=6.850
t6=8.562
t7=10.275
t8=11.987 (wait for 1.712 $\mu$s)

This routine (t1–t8) is repeated four times in sequence to produce one complete cycle of the sensor excitation waveform. It is then repeated until 256 complete waveforms have been produced as determined in step 70 and the resulting 2048 data points are stored. In this particular example, the resulting waveform has a period of 54.8 microseconds, or a sensor excitation frequency of 18.24818 kHz as mentioned above. The sensor output signal is in turn sampled at eight times the signal frequency, or at 145.9854 kHz. The wait periods occurring at times t4 and t8 are periods which have no specific signal processing activity.

FIG. 5 is a timing diagram illustrating the data acquisition procedure. The line D/A CLK represents the clock signal provided to the D/A 28 at times t1, t3, t5 and t7. The line A/D CLK represents the clock signal provided to the A/D 38 at times t2 and t6. As is shown, the sensor data s(n) is output from the A/D 38 at times t2 and t6. It is noted that the various timing of the respective signals can be provided via a dedicated clock circuit such as circuit 18 as shown in FIG. 1. Alternatively, the operating code carried out by the CPU 16 during the data acquisition process can be structured such that the time it takes to execute the code in relation to each step provides the appropriate timing. In such case the CPU 16 can issue the clock signals to the D/A 28 and A/D 38 directly.

It is also noted that when the signal processing circuit 10 is about to acquire sensor data as set forth in FIGS. 4 and 5, it may be desirable to first generate eight or more cycles of the excitation waveform prior to beginning the sampling process. This will allow adequate time for the hardware filters within the circuit 10 to settle.

The above described process for obtaining the FFT of the signal of interest is inherently very narrow band with an equivalent roll-off rate is over 5000 db per decade, and is therefore very immune to noise. Moreover, an even sharper roll-off is possible by increasing the number of data samples from 2048 to 4096. Processing the signal in the manner described can either provide very reliable signal measurements in a very noisy environment, or allow the reduction or elimination of interference shields in a somewhat quieter environment. In addition, the process only responds to the signal of interest, so changes in DC offsets of the processing circuitry have no effect. This aspect is particularly useful in applications subject to high electromagnetic fields, since such interfering signals tend to be rectified by the processing circuitry and change the circuit offsets. The process of the present invention is unresponsive to such interference.

Figure 6:
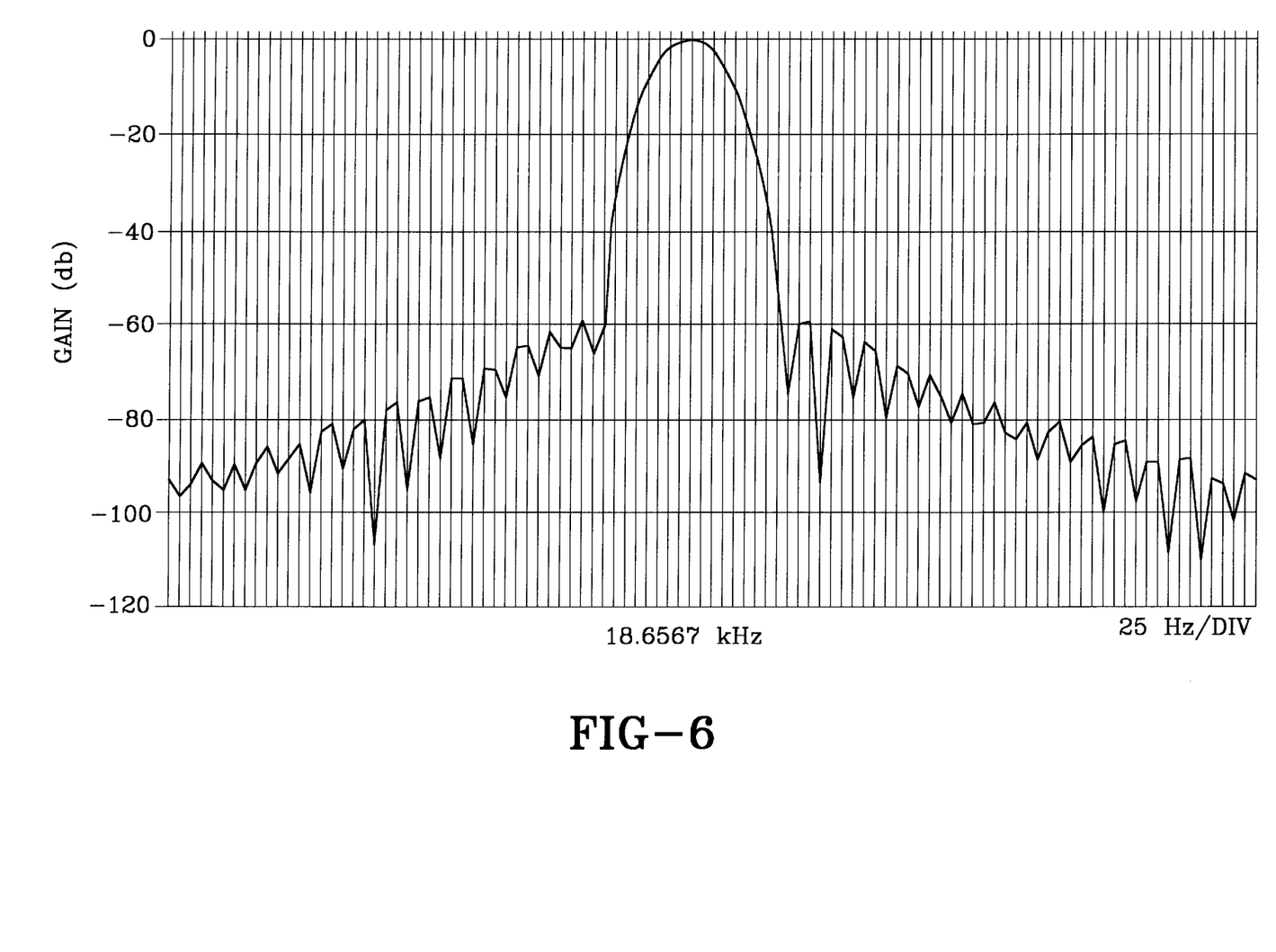
FIG. 6 is a plot of the bandpass response for the exemplary embodiment in accordance with the present invention.

FIG. 6 is a plot showing the bandpass response of the above-described process for processing the output signal of the sensor 12. The horizontal frequency scale is 25 Hz per division and the vertical scale is in decibels. As is shown in FIG. 6, the present invention results in a very narrow response bandwidth which is ideal in noisy environments. Moreover, the present invention provides the advantage that the FFT of the signal of interest can be calculated based substantially exclusively on real addition operations. Thus, the microprocessor can utilize its own basic software instructions and there is no need for a math coprocessor. Hence, even a low-speed microprocessor can be utilized resulting in a substantial cost savings, etc.

In fact, because relatively few computational operations are required of the microprocessor 14, it becomes relatively straightforward for the microprocessor to be able to process a plurality of sensor signals. For example, additional sensor channels 75 may be multiplexed into the anti-alias filter 36 as shown in phantom in FIG. 1. The microprocessor 14 can be responsible for processing the data obtained from each of the sensors.

Although the invention has been shown and described with respect to certain preferred embodiments, it is obvious that equivalents and modifications will occur to others skilled in the art upon the reading and understanding of the specification. For example, although the computation of the FFT was described primarily in the context of analyzing the output of a sensor, the present invention has application for various other types of signals of interest as will be appreciated. Moreover, although the invention was described in relation to specific frequencies, these specific frequencies are only for sake of example. The present invention may be useful for analyzing virtually any signal frequency.

In the exemplary embodiment, the spectral line components are reduced down to a total of eight using only real additions before attempting to compute the actual value of one or more of the spectral line components. It will be appreciated, however, that while eight spectral line components are considered optimum due to the ability to calculate the values of the spectral line components without any complex arithmetic operations, other numbers are possible. For example, if the reduction in step 56 (FIG. 2) were terminated at sixteen spectral line components, this would still offer an improvement over conventional FFT techniques. However, calculation of the real and imaginary components of one or more of the spectral line component values would involve slightly more processing than the case where the FFT is reduced to eight values. Also, a portion of the remaining calculations will require complex arithmetic operations. However, there is still a substantial reduction in the number of complex arithmetic operations performed as compared to conventional FFT computation techniques.

It is also possible to carry the reduction in step 56 down further to four spectral line components, for example. However, care must be taken to make sure the sampling rate satisfies the various sampling criterion, e.g., Nyquist, etc. Similarly, although the signal of interest is described herein as being sampled at an integral multiple equal to eight, other multiples are also possible. Again, however, care must be taken to ensure that the sampling criterion are satisfied as is conventional.

The above described embodiment is based on an FFT of 2048 samples at a sampling frequency of eight times the signal of interest. By varying the number of samples, the sampling frequency, and/or the number of spectral line components remaining after the FFT data reduction, the frequencies represented by the remaining spectral line components can be adjusted to virtually any frequency of interest. Moreover, although the sampling frequency is described herein as being an integral multiple of the signal of interest, this is not necessary. Rather, in those applications which require an excitation signal, for example, an integral multiple facilitates generation of the excitation signal and sampling of the signal in a phase lock relationship. Also, there is no need for non-integral frequency dividers or multipliers. Even still, such non-integral frequency relationships are certainly possible.

Furthermore, there is no need to limit the invention to those applications involving only a fixed frequency of interest. For example, by varying the sampling frequency while maintaining the other parameters, the frequency(s) represented by the calculated FFT can be varied or "swept" to some extent. Thus, it is possible to sweep a frequency band or bands and compute the FFT thereof with little or no complex arithmetic operations. The values of the FFTs can be updated quickly as the values are calculated without time consuming complex operations.

The present invention includes all such equivalents and modifications, and is limited only by the scope of the following claims.

What is claimed is:

1. A narrow band signal conditioner for processing an output signal from a device, comprising:
   a circuit for providing an excitation signal of a predetermined frequency to the device to produce the output signal;
   a sampling circuit for sampling the output signal at a predetermined sampling rate to generate a sequence of discrete time data samples representing the output signal, said predetermined frequency of the excitation signal being a subharmonic of said predetermined sampling rate;
   a memory for storing the sequence of discrete time data samples;
   a computational circuit for performing a decimation decomposition algorithm on the sequence of discrete time data samples of the memory to render a reduced number of data samples, each made up of a combination of selected discrete time data samples, and for computing a fast Fourier transformation (FFT) spectral line response of the output signal only at the predetermined excitation signal frequency from the reduced number of data samples.

2. The signal conditioner of claim 1, wherein the computational circuit computes the FFT spectral line response at the predetermined excitation signal frequency without any complex arithmetic operations.

3. The signal conditioner of claim 1, wherein the decimation decomposition algorithm is utilized to reduce the sequence of discrete time data samples to eight data samples.

4. The signal conditioner of claim 1, wherein the sampling circuit samples the output signal at a sampling rate which is phase locked to the predetermined excitation signal frequency.

5. The signal conditioner of claim 1, wherein the FFT spectral line response of the output signal at the predetermined excitation signal frequency is representative of a parameter sensed by the device in response to the excitation signal.

6. The signal conditioner of claim 1, wherein the sampling circuit and the circuit for providing the excitation signal are controlled by a common microprocessor and alternate obtaining samples and providing the excitation waveform data, respectively, according to a predetermined routine executed by the microprocessor.

7. The signal conditioner of claim 1, wherein the device comprises at least one of an inductive sensor, a capacitive sensor, and a resistive sensor.

8. The signal conditioner of claim 7, wherein the device is a capacitive sensor for determining fuel quantity in an aircraft.

9. The signal conditioner of claim 1, wherein the computational circuit computes the FFT spectral line response at the predetermined excitation signal frequency in real time.

10. The signal conditioner of claim 1, wherein the computational circuit includes a general purpose microprocessor.

11. The signal conditioner of claim 10, wherein output signals from a plurality of devices are processed by the general purpose microprocessor.

12. The signal conditioner of claim 1, wherein each of the combinations is made by adding the selected discrete time data samples.

13. The signal conditioner of claim 1, wherein each of the combinations is stored at a location in the memory at which one of the selected discrete time data samples used to make up the combination was previously stored.

* * * * *